Oct. 14, 1952   F. T. BLAYDES ET AL   2,613,583
TRACTOR-MOUNTED CULTIVATOR
Filed June 24, 1950   2 SHEETS—SHEET 1

Inventors:
Frederick T. Blaydes
Jack L. Bauman
By: Paul O. Rippel
Atty.

Oct. 14, 1952 — F. T. BLAYDES ET AL — 2,613,583
TRACTOR-MOUNTED CULTIVATOR
Filed June 24, 1950 — 2 SHEETS—SHEET 2
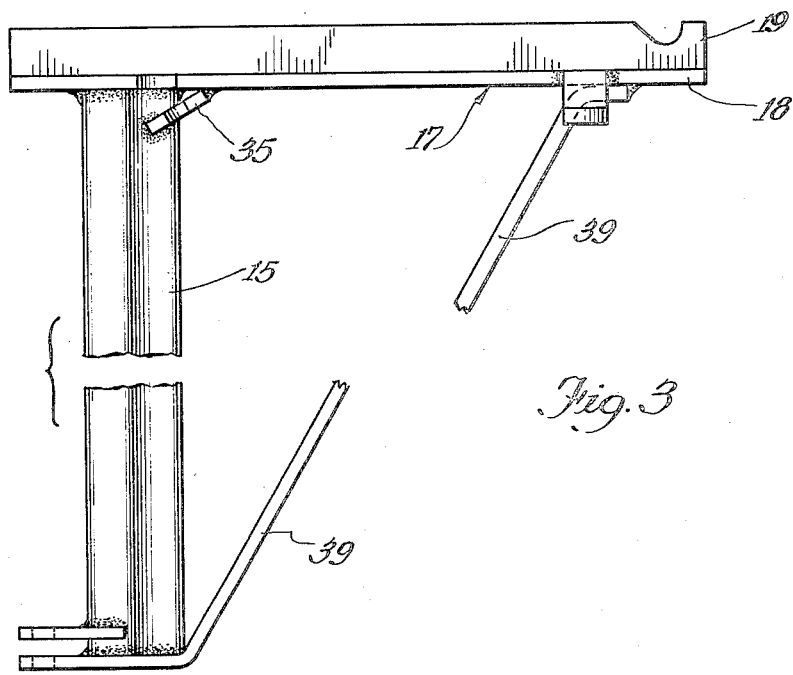
Fig. 3
Fig. 4
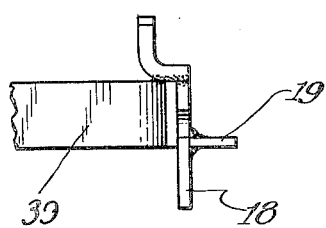
Inventors:
Frederick T. Blaydes.
Jack L. Bauman
By: Paul O. Pippel
atty.

Patented Oct. 14, 1952

2,613,583

UNITED STATES PATENT OFFICE 2,613,583

TRACTOR-MOUNTED CULTIVATOR

Frederick T. Blaydes and Jack L. Bauman, Canton, Ill., assignors to International Harvester Company, a corporation of New Jersey Application June 24, 1950, Serial No. 170,154

7 Claims. (Cl. 97—47)

This invention relates to agricultural implements and particularly to a tractor mounted-cultivator. More specifically the invention concerns improved means for mounting a cultivator upon a tractor to facilitate attachment and detachment thereof.

The cultivator with which the present invention is concerned is a multi-row implement and is mounted at the forward end of the tractor for maximum visibility by the tractor operator. Such a cultivator comprises a number of earth working units extending laterally from opposite sides of the tractor and is quite heavy, so that mounting the implement upon the tractor involves the expenditure of considerable time and effort on the part of workmen.

An important object of this invention is to provide an improved cultivator and mounting assembly facilitating attachment to and detachment of the implement from a tractor.

Another object of the invention is to provide a cultivator of the hinged type and improved means for mounting the implement upon the body of a tractor with a minimum expenditure of time and effort.

Another object of the invention is to provide an improved attaching assembly for mounting an implement upon a tractor including an attaching unit secured to and forming a part of the tractor sills, and mating elements on the implement frame adapted to form with the tractor attaching structure a rigid unit.

Other objects and advantages of the invention will become clear from the following detailed description when read in conjunction with the accompanying drawings, wherein:

Fig. 3 is a plan view of the implements and its attaching elements.

Fig. 4 is an end elevation of the structure shown in Fig. 3.

Figure 1:
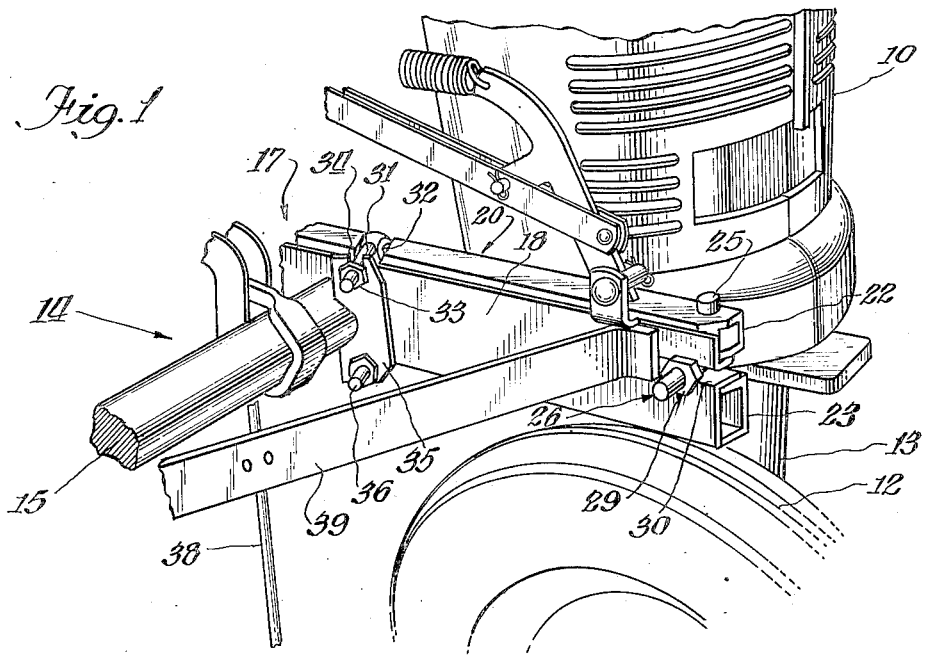
Fig. 1 is a perspective view of a portion of the front end of a tractor having mounted thereon implement attaching mechanism forming the subject-matter of this invention, and showing the implement attached.

Referring now to the drawings, it will be noted that the implement attaching structure with which the present invention is concerned is associated with a tractor having a body 10 and longitudinally extending side sills 11. The tractor 10 is of the tricycle type and only the front end thereof is shown supported upon a pair of dirigible wheels 12 mounted upon a steering column 13.

The implement with which the present invention is particularly concerned is a multi-row cultivator comprising two sections mounted on opposite sides of the tractor and extending laterally therefrom. Only one of these sections is shown since the sections and the attaching mechanism for mounting them upon the tractor are substantial duplicates. The section shown is the right-hand section and is designated by the numeral 14. The implement or implement section 14 is a cultivator comprising a transversely extending tool bar 15 upon which a number of cultivating units 16 are mounted. The inner end of the transverse tool bar 15 is affixed as by welding to a longitudinally extending attaching plate member 17 which is T-shaped in section, as shown particularly well in Figs. 2 and 4, and comprises a flattened head or base portion 18 and a longitudinally extending shank or flange portion 19 extending the length of the head portion 18 longitudinally of the tractor and projecting laterally inwardly from the middle portion thereof.

Attached to and forming a part of the tractor is a complementary attaching structure in the form of a bracket 20 secured in any suitable manner to the side sill 11 of the tractor. Bracket 20 is generally rectangular and comprises a base plate 21 and a pair of box-like portions 22 and 23 which are separated by a slot 24 extending longitudinally of the bracket 20 the full length thereof and which is of a depth and thickness substantially equal to that of the shank 19 of the T-shaped member 17. When the implement is mounted upon the tractor as shown in Fig. 1 the shank or flange portion 19 of the member 17 is received and confined in the slot 24 of bracket 20 and the face of the portions 22 and 23 of the bracket fit closely adjacent and engage the inner face of the base portion 18 of the implement attaching plate. The mounting of a heavy implement section such as 14 on the bracket is facilitated by the attaching structure so far described, it being relatively easy to guide the shank portion 19 of the attaching plate into the slot 24 of the tractor bracket.

In order to secure the implement to the tractor and to provide means facilitating the attachment and detachment of the implement, a vertical pivot bolt 25 is mounted in the forward end of the bracket 20. This pivot bolt passes entirely through the bracket and has mounted thereupon between the portions 22 and 23 a bolt 26 having a head portion 27 mounted on the pivot pin 25 and the shank 28 of the bolt is threaded to receive a nut 29. The bolt 26 is swingable about the axis of the pivot pin 25 in the slot 24 of the bracket. In Fig. 1 it will be noted that when the implement is attached to the tractor and the flange or shank 19 is received in the slot 24, the bolt 26 may be swung about its pivot into an open ended recess 30 formed in the forward end of the base plate 18. Thus when the forward ends of the attaching plate 17 and bracket 20 are connected by the swinging bolt 26, the implement itself may be swung in a horizontal plane about this pivotal connection represented by the axis of the pin 25. To secure the rear ends of the attaching members together another swinging bolt 31 is provided and mounted on a longitudinal axis in the upper portion 22 of the bracket 20. The pin 32 upon which the bolt 31 is pivoted is set at an angle in the bracket 20 so that the bolt 31 is angled somewhat forwardly. The bolt 31 is threaded to receive a nut 33 and is swingable about its pivot to a position such as indicated in Fig. 1 with the bolt seated in a recess 34 in a plate member 35 which is likewise angled to accommodate the bolt 31 and is secured as by welding to the attaching plate 18 and to the tool bar 15. Another bolt 36 is provided in the portion 23 of the bracket 20 and is a substantial duplicate of the bolt 31. Bolt 36 is received in a recess 37 in the lower portion of the plate member 35.

Figure 2:
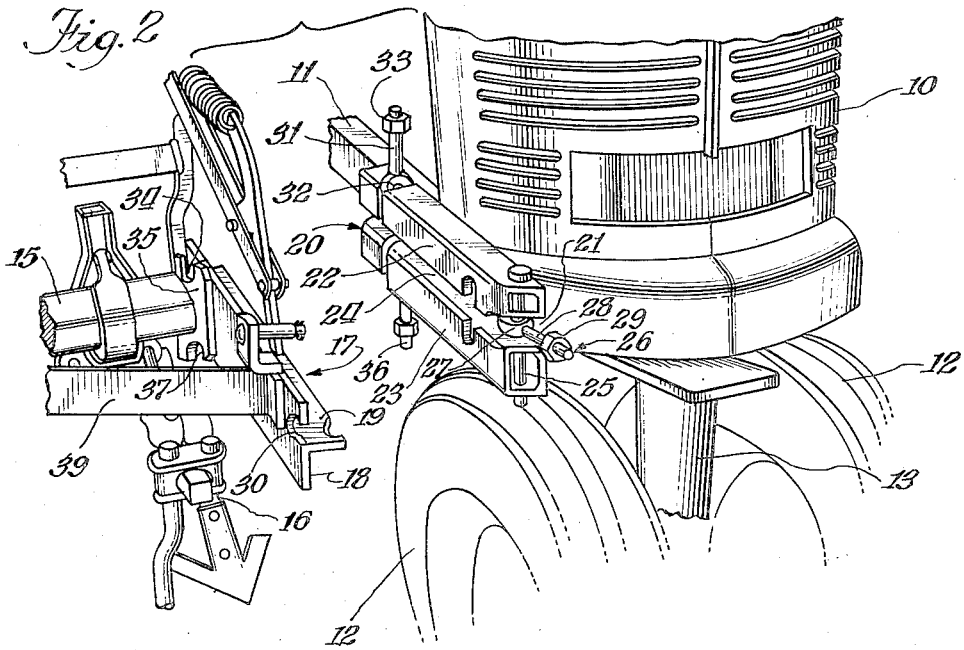
Fig. 2 is a perspective view similar to Fig. 1 showing the implement detached from the tractor.

The implement sections at each side of the tractor, as pointed out before, are substantial duplicates and each section is detached from the tractor by loosening the bolts 31 and 36 and swinging them out of the way to the positions indicated in Fig. 2. With very little effort then the tool section 14 may be swung in a horizontal plane forwardly about the axis of the pivot pin 25 until the rear portion of the implement frame is spaced sufficiently laterally away from the side of the tractor. Then by loosening the bolt 26 from the front end of the attaching plate 18 the tractor may be backed up and driven away from the implement. Suitable supporting mechanism 38 in the form of a ground engaging rod is provided and attached to a brace 39 to support the implement in substantially the position when detached from the tractor that it occupies when attached thereto. Separation of the implement from the tractor during lateral swinging thereof by displacement of bolt 26 from open-end slot 30 is resisted by the reception of pivot pin 25 in a horizontal slot 40 in the flange 19. Reattachment of the implement is facilitated by this arrangement, the tractor operator being able to drive the forward end of his tractor between the implement sections until the swinging bolt 26 is in a position to be swung into recess 30 of attaching plate 18 with the flange 19 received in the slot 24.

By the arrangement described in the foregoing it is necessary for the operator to handle only one section of a front mounted cultivator at a time instead of a single connected unit which extends from one side of the tractor to the other. It may also be understood that having described the invention in its preferred form, modifications may be made therein without departing from the spirit of the invention or the scope of the appended claims.

What is claimed is:

1. Attaching means for mounting an implement upon the side of a tractor to extend laterally therefrom, comprising a longitudinally extending plate member affixed to the implement having a flattened vertical face and a flange projecting laterally inwardly therefrom, a vertical pivot pin carried by the tractor at the side thereof, a swinging bolt member mounted on said pin for lateral swinging about the axis thereof, an open-end recess formed in the forward edge of said plate member to receive said swinging bolt to accommodate swinging of the implement in a horizontal plane about said pin to and from a position with said plate against the side of the tractor, a releasable connection between the tractor and the rear end of said plate member, and an open-end recess formed in said flange to receive said pin and resist displacement of said bolt from its associated slot during swinging of the implement about the axis of the pivot pin.

2. Attaching means for mounting an implement upon the side of a tractor to extend laterally therefrom, comprising a longitudinally extending plate member affixed to the implement having flattened vertical face portions and a flange portion extending the length of the plate member medially thereof and projecting laterally inwardly therefrom, an attaching bracket member secured to the side of the tractor extending longitudinally thereof, said bracket member having a flattened vertical face adapted to engage the vertical face portions of the plate member, a longitudinally and laterally extending slot formed in said bracket member medially thereof to receive the flange portion of said plate member, and means forming a vertical pivotal connection between the forward ends of said bracket and plate member, whereby the implement may be swung in a horizontal plane to and from a position with said flange portion received in said slot.

3. Attaching means for mounting an implement upon the side of a tractor to extend laterally therefrom, comprising a longitudinally extending plate member affixed to the implement having flattened vertical face portions and a flange portion extending the length of the plate member medially thereof and projecting laterally inwardly therefrom, an attaching bracket member secured to the side of the tractor extending longitudinally thereof, said bracket member having a flattened vertical face adapted to engage the vertical face portions of the plate member, a longitudinally extending slot formed in said bracket member medially thereof to receive the flange portion of said plate member, a vertical pivot pin carried at the forward end of said bracket member, a releasable connection between the forward end of the plate member and said bracket, and a releasable connection between the rear ends of said bracket and plate members to secure said members in juxtaposition when said flange portion is received in said slot.

4. Attaching means for mounting an implement upon the side of a tractor to extend laterally therefrom, comprising a longitudinally extending plate member affixed to the implement having flattened vertical face portions and a flange portion extending the length of the plate member medially thereof and projecting laterally inwardly therefrom, an attaching bracket member secured to the side of the tractor extending longitudinally thereof, said bracket member having a flattened vertical face adapted to engage the vertical face portions of the plate member, a longitudinally extending slot formed in said bracket member medially thereof to receive the flange portion of said plate member, a vertical pivot pin carried at the forward end of said bracket, a swinging bolt mounted on said pin for pivoting therewith, a recess formed in said plate member to receive said swinging bolt and accommodate swinging of the implement in a horizontal plane about said pin to and from a position with said flange portion received in said slot, and a releasable connection between the rear ends of said bracket and plate members.

5. In a tractor-mounted agricultural implement comprising a pair of tool sections mounted on opposite sides of the tractor to be supported therefrom, each said section including a transverse tool bar extending laterally from the side of the tractor at the forward end thereof, working tools carried by the tool bar and a ground supporting member for maintaining the implement at substantially the same height when detached from the tractor as when attached thereto, a plate member affixed to the inner end of the tool bar and extending longitudinally of the tractor, said plate member being T-shaped in section and having an upright head portion and a laterally inwardly extending shank, a longitudinally extending implement attaching member affixed to the tractor body comprising a rectangularly shaped bracket, a longitudinally extending slot formed in said bracket adapted to receive the laterally extending shank of said T-shaped plate member, a vertical pivot pin at the forward end of said bracket, means releasably connecting the forward end of said plate member to said pivot pin, whereby the implement section may be swung horizontally toward and away from the tractor about said vertical pivot to facilitate attachment and detachment of the implement from the tractor, and means releasably securing the rear portion of said plate member to the rear portion of said bracket when the shank portion of the plate is received in said slot.

6. In a tractor-mounted agricultural implement comprising a pair of tool sections mounted on opposite sides of the tractor to be supported therefrom, each said section including a transverse tool bar extending laterally from the side of the tractor at the forward end thereof, working tools carried by the tool bar and a ground supporting member for maintaining the implement at substantially the same height when detached from the tractor as when attached thereto, a plate member affixed to the inner end of the tool bar and extending longitudinally of the tractor, said plate member being T-shaped in section and having an upright head portion and a laterally inwardly extending shank, an implement attaching structure at the side of the tractor having a flattened vertical face adapted to engage the head of said T-shaped member, a longitudinally extending slot formed in said attaching structure to receive and confine the shank of the T-shaped member when the head thereof is brought into engagement with the attaching structure, and means pivotally connecting the forward end of said plate member to said attaching structure for swinging of the implement in a horizontal plane about a vertical pivot.

7. In a tractor-mounted agricultural implement comprising a pair of tool sections mounted on opposite sides of the tractor to be supported therefrom, each said section including a transverse tool bar extending laterally from the side of the tractor at the forward end thereof, working tools carried by the tool bar and a ground supporting member for maintaining the implement at substantially the same height when detached from the tractor as when attached thereto, a plate member affixed to the inner end of the tool bar and extending longitudinally of the tractor, said plate member being T-shaped in section and having an upright head portion and a laterally inwardly extending shank, an implement attaching structure at the side of the tractor having a flattened vertical face adapted to engage the head of said T-shaped member, a longitudinally extending slot formed in said attaching structure to receive and confine the shank of the T-shaped member when the head thereof is brought into engagement with the attaching structure, a vertical pivot pin carried by the attaching structure, a bolt mounted on said pivot pin for swinging movement in said slot, and a recess formed in the forward end of said plate member to receive said bolt, whereby said implement is swingable in a horizontal plane about said pivot, and means releasably securing the rear portion of said plate member to the attaching structure on the tractor.

FREDERICK T. BLAYDES.
JACK L. BAUMAN.

REFERENCES CITED

The following references are of record in the file of this patent:

UNITED STATES PATENTS

| Number | Name | Date |
|---|---|---|
| 443,275 | Guilford et al. | Dec. 23, 1890 |
| 1,514,656 | Comer | Nov. 11, 1924 |
| 2,129,724 | Acton | Sept. 13, 1938 |
| 2,195,611 | Brown | Apr. 2, 1940 |
| 2,209,029 | Kriegbaum et al. | July 23, 1940 |
| 2,423,148 | Johnson | July 1, 1947 |